April 30, 1968   J. W. WILSON   3,380,764
END FITTINGS FOR FLEXIBLE CONDUITS AND THE LIKE
Filed Jan. 28, 1965   2 Sheets-Sheet 1

INVENTOR
JOHN WILLIAM WILSON

BY Dean, Fairbank & Hirsch
ATTORNEYS

April 30, 1968   J. W. WILSON   3,380,764
END FITTINGS FOR FLEXIBLE CONDUITS AND THE LIKE
Filed Jan. 28, 1965   2 Sheets-Sheet 2

INVENTOR
JOHN WILLIAM WILSON
BY Dean, Fairbank & Hirsch
ATTORNEYS

United States Patent Office 3,380,764
Patented Apr. 30, 1968

3,380,764
END FITTINGS FOR FLEXIBLE CONDUITS AND THE LIKE
John William Wilson, Farnham Royal, Slough, England, assignor to Superflexit Limited, Slough, England
Filed Jan. 28, 1965, Ser. No. 428,826
Claims priority, application Great Britain, July 7, 1964, 28,970/64
2 Claims. (Cl. 285—249)

ABSTRACT OF THE DISCLOSURE

An end fitting for flexible convoluted conduits in which the end of the conduit is turned outwardly or inwardly and is gripped between a nipple and a ferrule or collar, the parts being moved into gripping engagement with the conduit by means of a sleeve nut.

---

This invention relates to end fittings for flexible conduits and the like which are formed internally and externally with helical convolutions. The conduits may be formed from plastics material such as polyvinylchloride, or from one of the fluocarbon products such as polytetrafluorethylene, a polyamide or from synthetic or natural rubber.

Such flexible conduits find particular use in electrical harnesses and layouts for aircraft, rockets, guided missiles and the like, the condiuts being adapted to contain bunched electrical conductors soldered or otherwise connected to electrical pins or sockets carried by a multi-pin or multi-socket head whereby electrical connection may be established with co-operating sockets or pins respectively.

In the fields, such as the aircraft field, referred to above, because of the limited space available for electrical apparatus, and the confined space in which such apparatus is located, it is advantageous to reduce the dimensions of the end fittings of flexible conduits to a minimum, to provide maximum flexibility for the conduits and simplify as far as possible, the method and means of assembling such end fittings.

Thus, an object of the present invention is to provide an end fitting for flexible conduits which is of reduced axial length compared with conventional end fittings of corresponding type.

Referring to the accompanying drawings:

FIGURES 1 to 4 illustrate four alternative types of end fittings in accordance with the present invention in half section, half elevation.

Figure 1:
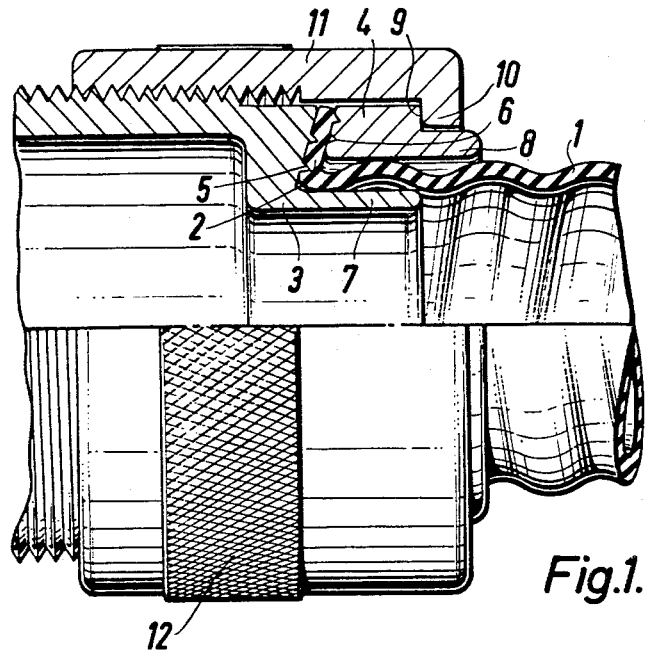

Referring in the first case to FIGURE 1, the internally and externally helically convoluted conduit 1 has its extremity flared outwardly at 2 by the insertion of a suitable tool into the end of the conduit, the part 2 being gripped between the inclined face of a nipple or nipple adaptor 3 and a correspondingly inclined face of a ferrule 4, the inclined faces being formed respectively with annular projections 5 and annular grooves 6 which enter and receive respectively the material comprising the conduit and ensure a good seal.

The nipple 3 includes a cylindrical part 7, which lies within the conduit whilst the ferrule 4 is formed with a cylindrical part 8 which surrounds the conduit, the ferrule being formed with a shoulder 9 which is engaged by an inwardly directed flange 10 on the end of a sleeve nut 11 in threaded engagement with the nipple 3 or other part and by tightening the nut 11 parts 4 and 3 will be urged into gripping engagement with the end of the conduit, thus securing the conduit firmly to the end fitting.

The nut 11 may be externally knurled as at 12 or otherwise formed to facilitate its rotation.

Figure 2:
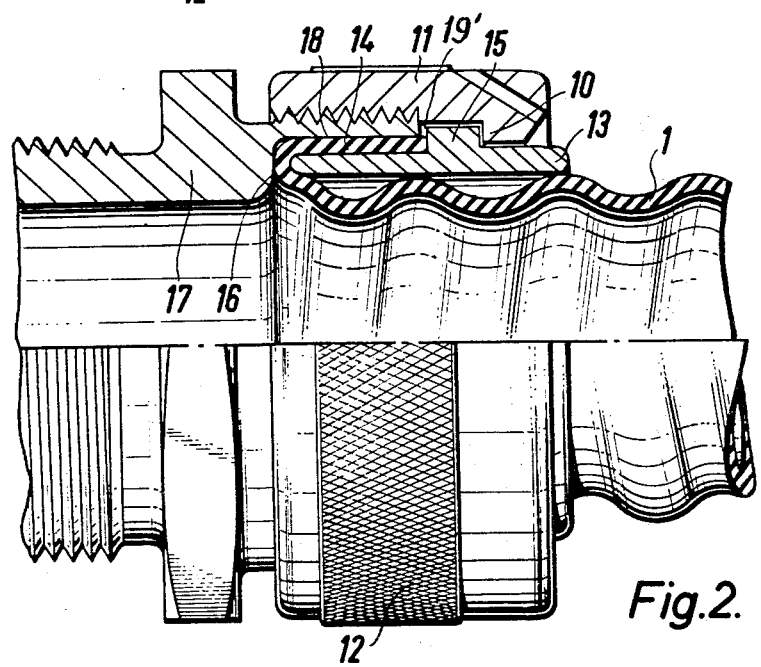

The end fitting shown in FIGURE 2 includes a collar 13 which encloses the end of the conduit 1, the extremity of the condiut being turned back at 14 in a similar manner to a cuffs and around the end of the collar.

The collar is formed with an annular flange 15 against which the extremity of the part 14 abuts, the opposite edge of the flange being engaged by the flange 10 on the nut 11, to move the collar 13 endwise and cause the conduit to be gripped between the rounded extremity of the collar and an internal shoulder 16 on a connector 17 which is enlarged at 18 to receive the part 14 of the conduit, a clearance 19' being left between parts 15 and 17 to ensure that the conduit will always be firmly held between part 13 and shoulder 16. The connector 17 is externally screw threaded to receive the sleeve nut 11, the latter being knurled or otherwise formed as at 12 to facilitate its rotation.

Figure 3:
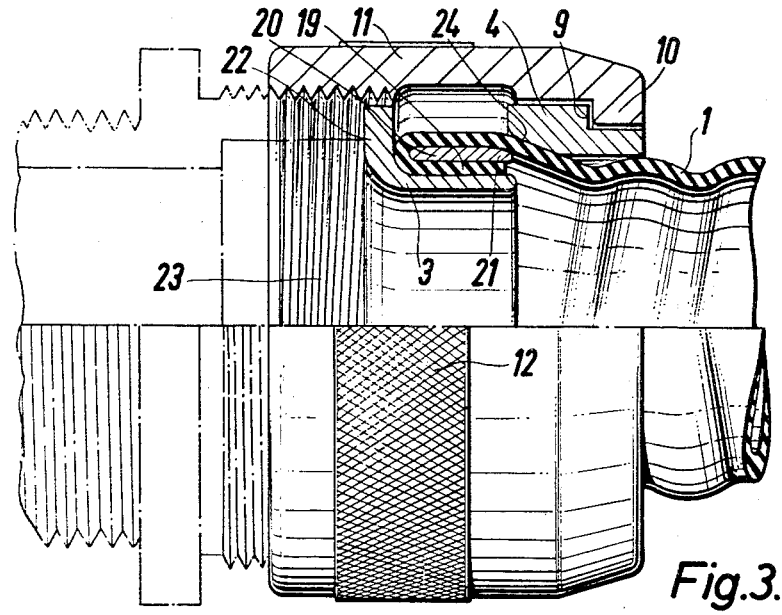

In FIGURE 3 the extremity of the conduit is turned inwardly at 19 around an annular ring 20, the latter being chamfered as at 21 at its extremity. The ring 20 and the part 19 of the conduit surround a nipple 3 having an outwardly directed flange 22 which abuts against the face of a part 23 which is externally threaded to receive a sleeve nut 11.

The nut 11 has a flange 10 which engages a shoulder 9 on a collar or ferrule 4 having an inclined inner face 24 which engages the outer surface of the conduit, the conduit being gripped between the face 24 and chamfer 21 on the ring 20 as a result of tightening the sleeve nut, tightening the nut at the same time moving the ring 20 endwise to grip the turned over part of the conduit between the rounded edge of the ring and the flange 22.

Figure 4:
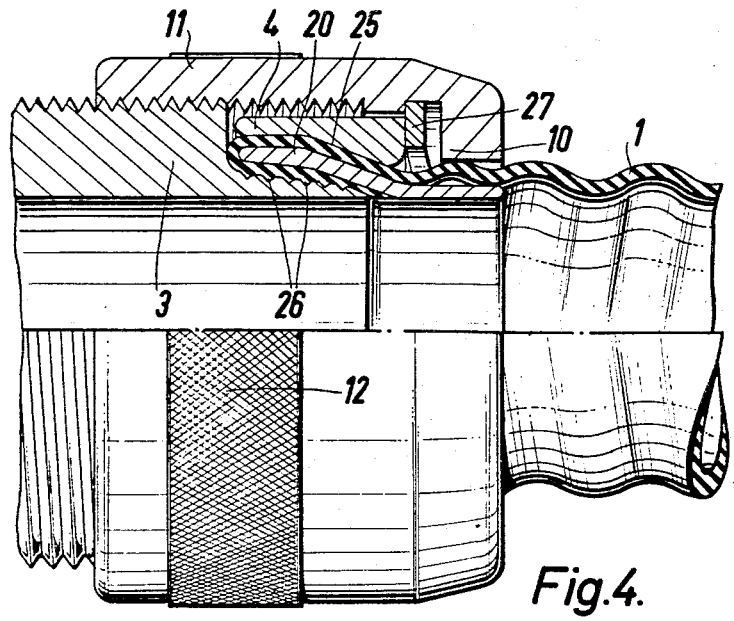

In the construction shown in FIGURE 4 the end of the conduit is turned inwardly around the rounded edge of a ring 20 and into the interior thereof, the ring including cylindrical parts of different diameters connected by a frusto-conical part, a collar or ferrule 4 surrounding the ring and including a cylindrical part and a part having an inclined face 25 having the same degree of taper as the ring 20.

The ring 20 surrounds the end of a nipple or sleeve adaptor 3 having a tapered surface formed with annular grooves 26 into which the material of the conduit can enter to ensure a good seal.

The collar 4 is forced endwise into the operative position shown by a sleeve nut 11 in threaded engagement with external screw threads on the part 3 and through the medium of a bowed circlip 27 which prevents any slackening of the grip on the conduit consequent upon temperature variations.

Preferably, the flexible conduit is formed of polytetrafluorethylene since this material has the characteristics required for the patricular fields in which the end fittings are particularly useful. This material not only retains its characteristics over a wide temperature range, but also, the material is sufficiently flexible to enable the ends of a conduit to be turned inwardly or outwardly, or the material stretched as required, and return to its original form, i.e. the material has a memory allowing the material to return to its original form within a very short time following the removal of any distorting stress therefrom.

In all the constructions illustrated the sleeve nut may be in threaded engagement with a part of a multi-pin connector as for example as in FIGURE 3 or may engage a tubular part or adaptor which may be associated with a bulkhead or other part. As a further alternative the nut may have a threaded connection with a junction fitting for example one of the limbs of a T-shaped fitting.

I claim:

1. An end fitting for a flexibly convoluted conduit, comprising a nipple having a cylindrical part and a radial part, a ring adapted for insertion in the end of the conduit, the end of the conduit being turned inwardly and into the interior of the ring, the ring surrounding the cylindrical part of the nipple, the inwardly turned part of the conduit being sandwiched between the cylindrical part of the nipple and the ring and between the edge of the ring and the radial part of the nipple, a collar surrounding the conduit and a sleeve nut engaging the collar and having means to move the latter into a position in which the conduit will be gripped between the collar and the ring.

2. An end fitting as claimed in claim 1, wherein the inner surface of the collar where it engages the conduit is tapered, and the edge portion of the ring opposite the tapered surface is chamfered to provide opposed gripping surfaces for the conduit.

References Cited

UNITED STATES PATENTS

| 448,717 | 3/1891 | Hogan | 285—385 |
| 969,216 | 9/1910 | Stephens | 285—385 X |
| 3,078,109 | 2/1963 | Jackson et al. | 285—259 X |
| 3,087,745 | 4/1963 | Rumbell | 285—149 |
| 3,191,971 | 6/1965 | Somers | 285—248 X |

FOREIGN PATENTS

| 113,042 | 9/1900 | Germany. |
| 892,194 | 3/1962 | Great Britain. |

CARL W. TOMLIN, *Primary Examiner.*

T. F. CALLAGHAN, *Assistant Examiner.*